US012544869B2

(12) United States Patent
Goldberg et al.

(10) Patent No.: US 12,544,869 B2
(45) Date of Patent: Feb. 10, 2026

(54) TOOL FOR SCALABLE MULTI-FASTENER TORQUEING

(71) Applicant: Raytheon Company, Waltham, MA (US)

(72) Inventors: Noah Benjamin Goldberg, Wellesley, MA (US); Gavin Thomas Adams, Wrentham, MA (US); Michael P. Martinez, Worcester, MA (US)

(73) Assignee: Raytheon Company, Arlington, VA (US)

( * ) Notice: Subject to any disclaimer, the term of this patent is extended or adjusted under 35 U.S.C. 154(b) by 902 days.

(21) Appl. No.: 17/374,444

(22) Filed: Jul. 13, 2021

(65) Prior Publication Data

US 2023/0020680 A1    Jan. 19, 2023

(51) Int. Cl.
| | |
|---|---|
| B23P 19/00 | (2006.01) |
| B23P 19/06 | (2006.01) |
| B25B 13/50 | (2006.01) |
| B25B 17/00 | (2006.01) |
| B25B 23/142 | (2006.01) |
| H05K 13/04 | (2006.01) |

(52) U.S. Cl.
CPC ........... B23P 19/065 (2013.01); B23P 19/069 (2013.01); B25B 13/50 (2013.01); B25B 17/00 (2013.01); B25B 23/1427 (2013.01)

(58) Field of Classification Search
CPC ...... B23P 19/065; B23P 19/069; B25B 13/48; B25B 13/481; B25B 13/50; B25B 23/14; B25B 23/1427; B25B 17/00
See application file for complete search history.

(56) References Cited

U.S. PATENT DOCUMENTS

| | | | |
|---|---|---|---|
| 5,074,170 A | 12/1991 | Shirley | |
| 5,595,251 A | 1/1997 | Cook, Jr. | |
| 7,637,182 B1 | 12/2009 | Long | |
| 8,826,777 B1 | 9/2014 | Shieh | |
| 10,576,590 B2 * | 3/2020 | Gebrehiwot | .......... B23P 19/069 |
| 10,919,139 B2 * | 2/2021 | Andersen | ................ B25B 17/00 |
| 2006/0169107 A1 | 8/2006 | Taniguchi et al. | |
| 2009/0064824 A1 | 3/2009 | Tsuyoshi et al. | |
| 2010/0050820 A1 | 3/2010 | Coronado et al. | |
| 2016/0318159 A1 | 11/2016 | Gates et al. | |
| 2017/0157750 A1 | 6/2017 | Koenes | |

FOREIGN PATENT DOCUMENTS

WO    2020/126100 A1    6/2020

OTHER PUBLICATIONS

International Search Report and Written Opinion Dated Oct. 7, 2022 for corresponding application PCT/US2022/036822.

* cited by examiner

*Primary Examiner* — Paul D Kim
(74) *Attorney, Agent, or Firm* — Bachman & LaPointe, P.C.

(57) ABSTRACT

A tool includes a first output from a gear system, the first output along a first axis and a second output from the gear system, the second output along a second axis. A first torque limiter is attached to the first output along the first axis and a second torque limiter is attached to the second output along the second axis. A first tool bit is attached to the first torque limiter along the first axis and a second tool bit attached to the second torque limiter along the second axis.

19 Claims, 6 Drawing Sheets

TOOL FOR SCALABLE MULTI-FASTENER TORQUEING

BACKGROUND

The present disclosure relates to tools, and more particularly to a tool to remove and install an electronic module.

Slat module or brick architectures arrange the modules closely within a chassis. The continued miniaturization of electronic components and the resultant denser arrangement of such modules in locations that may be difficult to access, complicates module removal and installation. Installation may also be further complicated as the modules may utilize a low-profile grounding scheme in which metal spring fingers provide a conductive path to form a ground plane. Additionally, blind-mating captive fasteners allows the depth of the chassis to be reduced as there is no need to accommodate a flex cable bend radius but complicates installation.

Installation of electronic modules often requires independently torqueing a multiple of blind-mating captive fasteners. A rocking motion may be generated during this torque application which may result in a gap at the spring fingers such that some spring fingers may be compressed beyond an allowable limit. This may disadvantageously result in mismated connectors and potential breakage.

SUMMARY

A tool according to one disclosed non-limiting embodiment of the present disclosure includes an input to a gear system; a first output from the gear system, the first output along a first axis; a second output from the gear system, the second output along a second axis; a first torque limiter attached to the first output along the first axis; a second torque limiter attached to the second output along the second axis; a first tool bit attached to the first torque limiter along the first axis; and a second tool bit attached to the second torque limiter along the second axis.

A further embodiment of any of the foregoing embodiments of the present disclosure includes that the first axis and the second axis are parallel.

A further embodiment of any of the foregoing embodiments of the present disclosure includes a housing that contains the gear system.

A further embodiment of any of the foregoing embodiments of the present disclosure includes an index that is received onto a handle of a module assembly.

A further embodiment of any of the foregoing embodiments of the present disclosure includes a tool handle that extends from the housing perpendicular to the index.

A further embodiment of any of the foregoing embodiments of the present disclosure includes that the first and second torque limiter comprise a square drive interface for attachment to the output.

A further embodiment of any of the foregoing embodiments of the present disclosure includes that the first and second torque limiter comprise a square drive interface for attachment of the tool bit.

A further embodiment of any of the foregoing embodiments of the present disclosure includes that the first and second tool bit is a hex bit.

A further embodiment of any of the foregoing embodiments of the present disclosure includes that the first and second tool bit is a screw-driver bit.

A further embodiment of any of the foregoing embodiments of the present disclosure includes that the gear system comprises a staggered 5-gear pattern.

A further embodiment of any of the foregoing embodiments of the present disclosure includes that each gear of the gear system is identical.

A further embodiment of any of the foregoing embodiments of the present disclosure includes that the gear system comprises a 4-gear pattern that provides a scaled system between the first and second outputs.

A tool for installing and removing a module assembly according to one disclosed non-limiting embodiment of the present disclosure includes a housing comprising an index that is received onto a handle of the module assembly; a gear system contained within the housing; an input to the gear system; a first output from the gear system, the first output along a first axis; a second output from the gear system, the second output along a second axis, the second axis parallel to the first axis; a first torque limiter attached to the first output along the first axis; a second torque limiter attached to the second output along the second axis; a first tool bit attached to the first torque limiter along the first axis; and a second tool bit attached to the second torque limiter along the second axis.

A further embodiment of any of the foregoing embodiments of the present disclosure includes that the first and second torque limiter comprise a male square drive interface for attachment to the output.

A further embodiment of any of the foregoing embodiments of the present disclosure includes that the first and second torque limiter comprise a female square drive interface for attachment of the tool bit.

A further embodiment of any of the foregoing embodiments of the present disclosure includes a tool handle that extends from the housing perpendicular to the interface.

A method for installing a module assembly according to one disclosed non-limiting embodiment of the present disclosure includes locating an index of a tool onto a handle of the module assembly such that a respective first and second tool bit from a first and a second output of the tool are aligned and preloaded onto a first and second blind fastener of the module assembly; and driving an input to a gear system of the tool until each of a first and a second torque limiter mounted between the respective first and second output and the first and second tool bit independently reach the desired preset torque.

A further embodiment of any of the foregoing embodiments of the present disclosure includes that the first tool bit is located along a first axis and the second tool bit is located along a second axis.

A further embodiment of any of the foregoing embodiments of the present disclosure includes that the first axis is parallel to the second axis.

A further embodiment of any of the foregoing embodiments of the present disclosure includes that driving the input to the gear system of the tool comprises driving the input until there is a clicking from each of a first and a second torque limiter.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary rather than defined by the limitations within and are non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
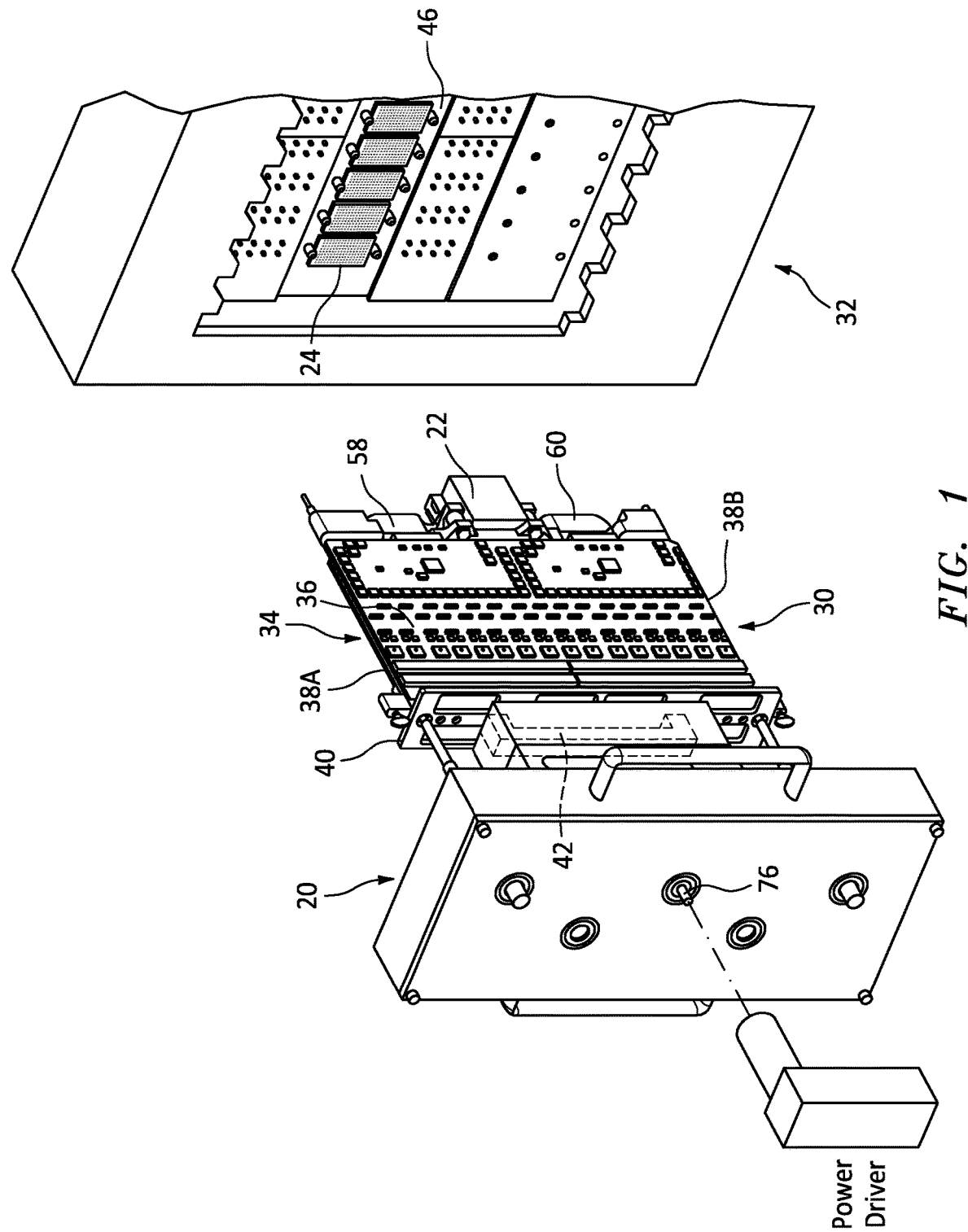
FIG. 1 is a schematic perspective view of a tool engaged with a module assembly for installation into a chassis.

FIG. 1 schematically illustrates a tool 20 that facilitates installation and removal of a module assembly 30 from a chassis 32 (illustrated schematically). The module assembly 30 may include, for example only, any suitable type of electronic module, such as a radar array SLAT module, a power converter module, a power amplifier module, a digital receiver/exciter module, and a digital/fiber optic control module.

The module assembly 30 may include a support structure 34 for electronic components 36 (illustrated schematically) mounted thereto. For example, an electronic module assembly may include a circuit board and a heat sink that is mounted on one or more support structures or frames. As another example, an electronic module assembly may refer to a circuit board and a mounting bracket that is coupled to the circuit board.

The support structure 34 may include two or more blind fasteners 38A, 38B, e.g., a ¼-turning top and bottom captive fasteners that are fastened into the chassis 32 to retain the module assembly 30 therein. The support structure 34 may also include a face plate 40 transverse to the blind fasteners 38A, 38B with a handle 42 that extends therefrom. The module assembly 30, in one example, may be advanced along alignment pins which pick up alignment holes in the chassis 32 towards a main board 46 such that an electrical connector 22 of the module assembly 30 engages a socket 24 on the main board 46 and is supported within the chassis 32. It should be appreciated that various installation structures within the chassis 32 may benefit herefrom.

Figure 2:
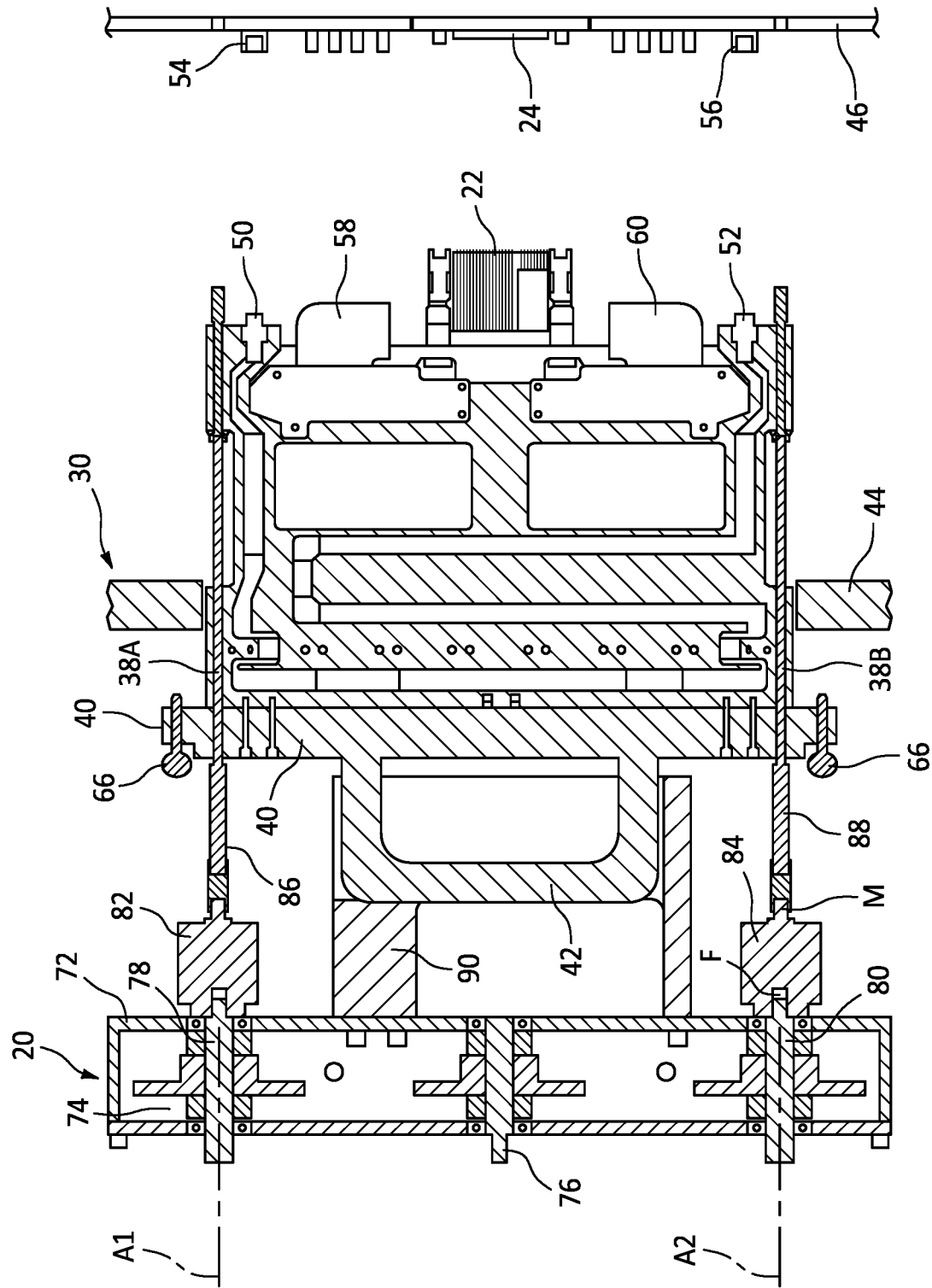
FIG. 2 is a cross-sectional view of the tool.

With reference to FIG. 2, an input and output fluid quick disconnect 50, 52 of the module assembly 30 couples to a respective fluid quick disconnect 54, 56 on the chassis 32 to provide a cooling flow path through the module assembly 30. Other connectors 58, 60 such a bullet connectors, etc., may alternatively or additionally be provided. It should be appreciated that various module assemblies will include various connection architectures.

Figure 3:
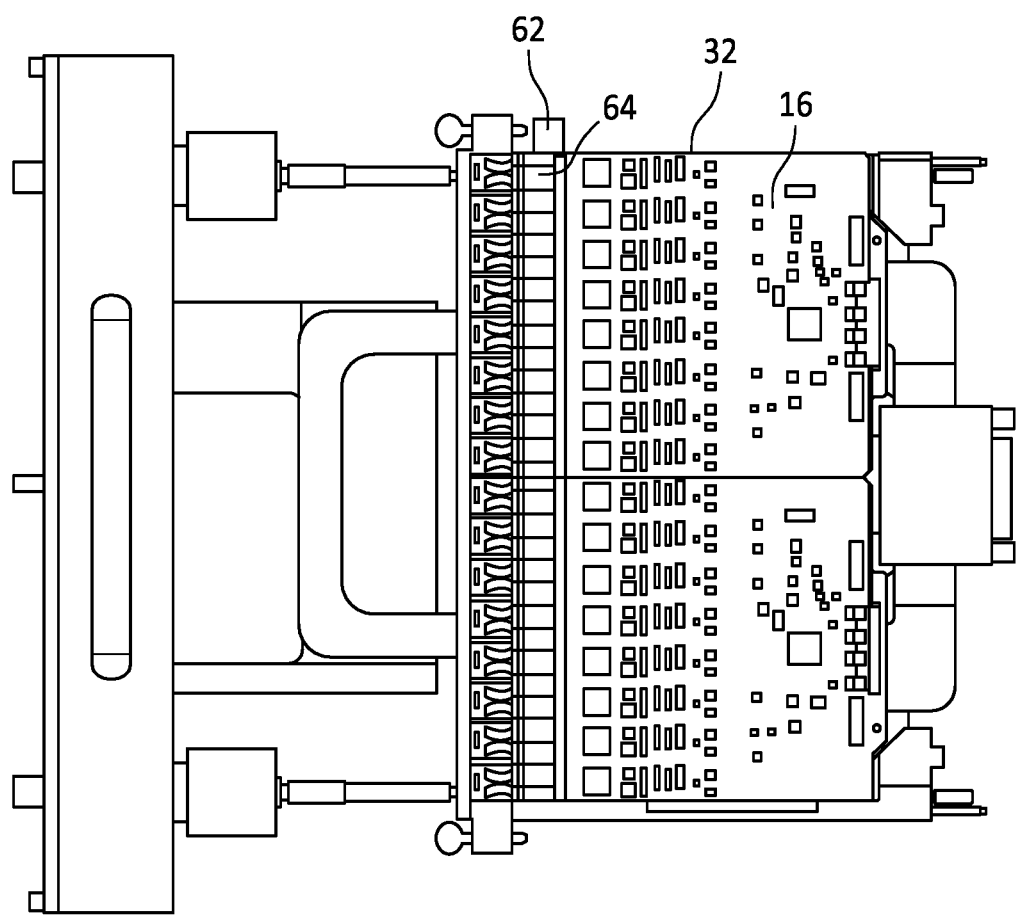
FIG. 3 is a side view of the tool engaged with a module assembly.
Figure 4:
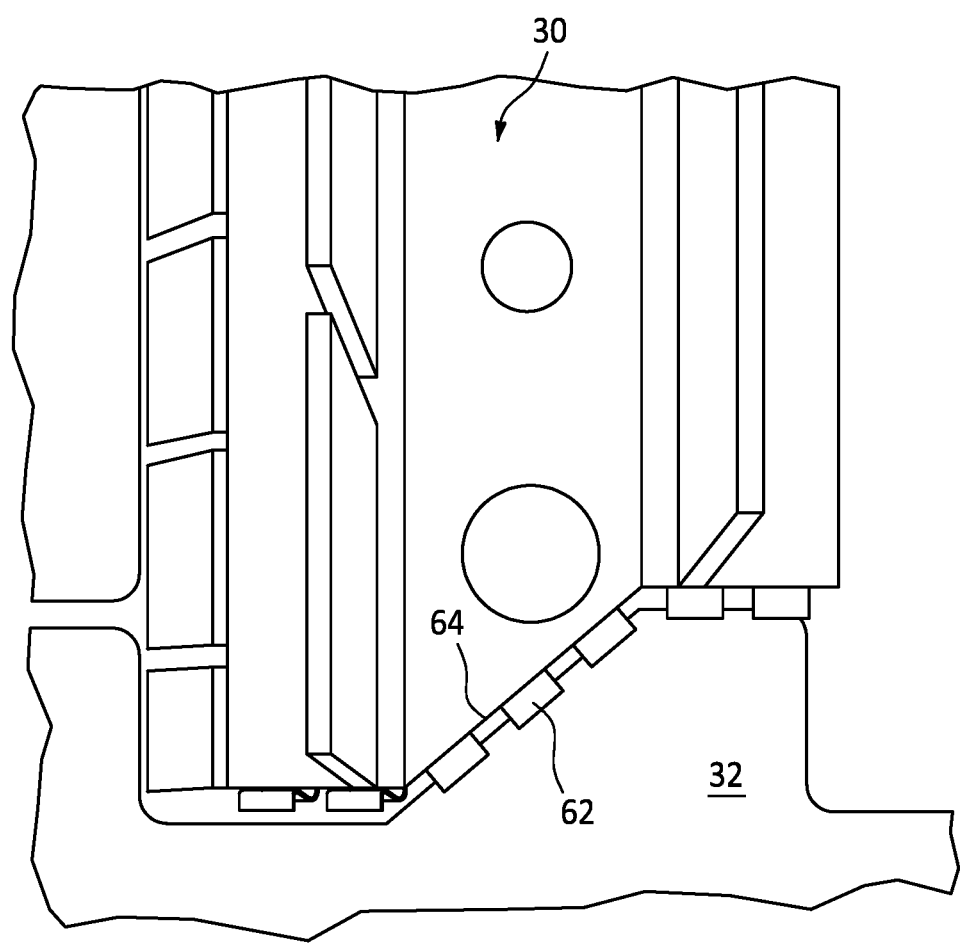
FIG. 4 is an edge view of module assembly illustrating the spring fingers.

As the support structure 34 is inserted, a multiple of spring fingers 62 (FIG. 3 and FIG. 4) that extend from the chassis 32 interface with contacts 64 in communication with the electronic components 16 of the module assembly 30. The metal spring fingers 62 provide a conductive path with the contacts 64 to form a ground plane. The metal spring fingers 62 are designed to compress between 20%-80% of their nominal value and typically provide the primary resistance to installation of the module assembly 30 into the chassis 32. The two or more blind fasteners 38A, 38B are then torqued to a desired value to retain the module assembly 30 to the chassis 32. External fasteners 66 in the face plate 40 may then be finger tightened.

Figure 5:
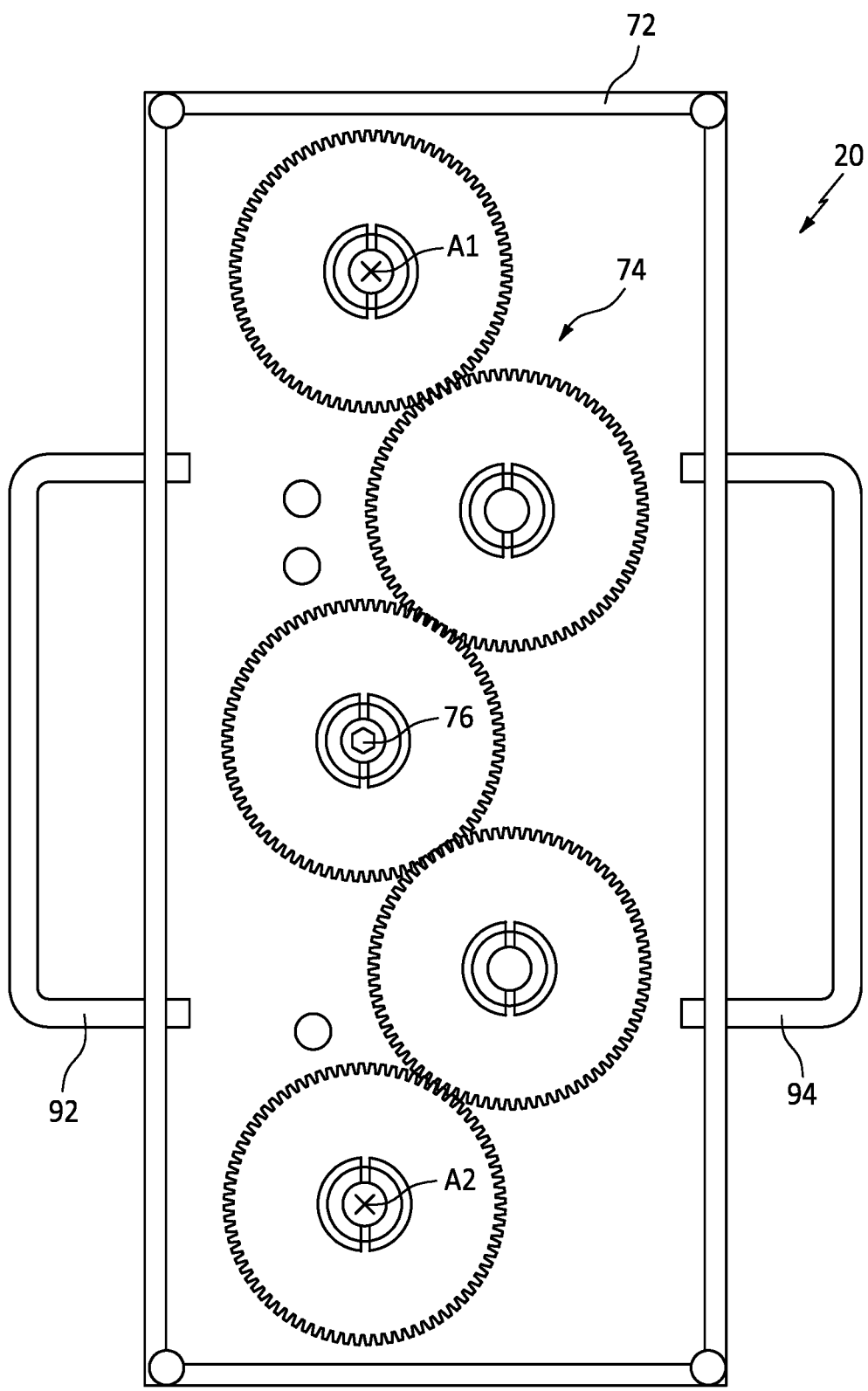
FIG. 5 is a schematic cross-sectional view of the tool illustrating a gear system according to one disclosed embodiment.

The tool 20 generally includes a housing 72, a gear system 74 (also shown in FIG. 5), an input 76 (also shown in FIG. 1) to the gear system 74, two or more outputs 78, 80 from the gear system 74, two or more torque limiters 82, 84 from the respective outputs 78, 80, and a respective tool bit 86, 88, that extends from the torque limiters 82, 84.

The housing 72 includes an index 90 that is received onto the handle 42. The index 90 may be a rectilinear structure with a slot that extends from the housing 72 to closely fit onto the handle 42 of the module assembly 30. The index 90 facilitates positioning of the tool 20 with respect to the module assembly 30. Tool handles 92, 94 (also shown in FIG. 1 and FIG. 4) extend from the housing 72 perpendicular to the index 90 to facilitate operator retention of the tool 20 and the supported module assembly 30.

In one embodiment, the gear system 74 may include a staggered 5-gear pattern (FIG. 5) that permits the outputs 78, 80 to turn in the same direction as the input 76. The staggered 5-gear pattern permits a precise distance between the respective outputs 78, 80, i.e., parallel axes A1, A2, associated with the blind fasteners 38A, 38B without the necessity of custom sized gears. Alternatively, four gears may permit a scaled system between outputs 78, 80. Although a particular gear system is illustrated in the disclosed embodiment, various gear systems may alternatively be utilized. In addition, as the torque limiters 82, 84 are separate from the gear system 74, the gear system 74 may be relatively uncomplicated.

The torque limiters 82, 84 are mounted to the respective outputs 78, 80 along the respective axes A1, A2. The torque limiters 82, 84 may be self-contained slip-torque limiters such as Seekonk part number AD-260 manufactured by Seekonk Precision Tools of Seekonk MA, USA. The torque limiters 82, 84 set the desired torque value and are removably mounted between the respective outputs 78, 80 and tool bit 86, 88. The respective tool bit 86, 88 may be attached to the torque limiters 82, 84 via a female attachment. The tool bit 86, 88 may be conventional hex bits, screwdriver bits, sockets, etc., that are removably attached to the torque limiters 82, 84. The torque limiters 82, 84 may include both a female F and a male M coupling. In one embodiment, the female socket to which the respective tool bit 86, 88 is attached may be square or hexagonal in shape and the torque limiters 82, 84 are attached to the respective outputs 78, 80 via a female square or hexagonal connection fitting. The torque limiters 82, 84 permit the blind fasteners 38A, 38B to independently reach their torque limit at different points utilizing a power drive or wrench applied to the single input 76. The external torque limiters 82, 84 also allow the tool 20 to be readily adapted by the expedient of replacing the torque limiters 82, 84 of a different preset torque.

Figure 6:
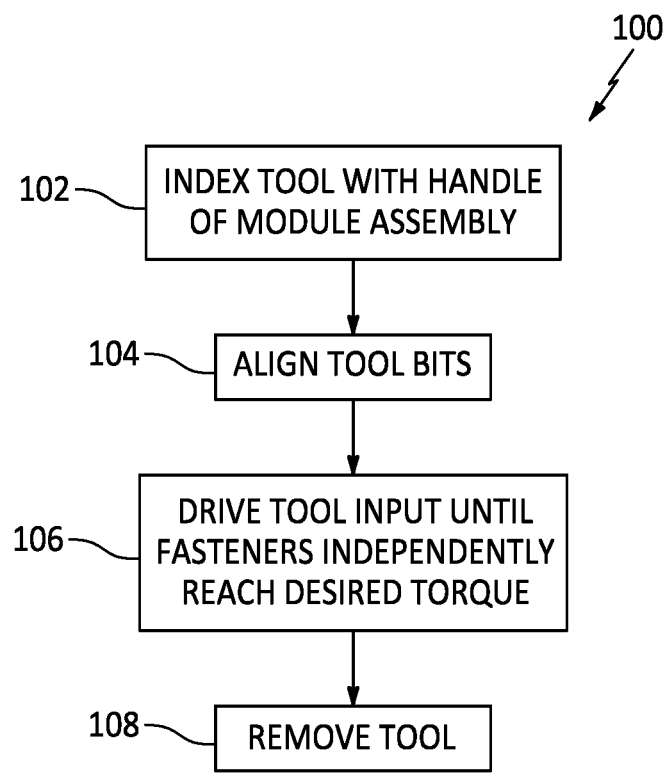
FIG. 6 is a block diagram of a method for installing a module assembly into a chassis.

With reference to FIG. 6, a method 100 for installing the module assembly 30 initially includes locating the index 90 of the tool 20 onto the handle 42 of the module assembly 30 that is set in the chassis (step 102). The respective tool bits 86, 88 are thereby aligned and preloaded onto the blind fasteners 38A, 38B (step 104). Then, the input 76 is driven (step 106). The operator thereby need only power the drive until there is a clicking from both torque limiters 82, 84 which notes that the proper torque has been achieved. The tool 20 is then removed from the installed module assembly 30 (108).

The tool 20 facilitates the proper torqueing of captive fasteners utilizing a single input. The tool bits simultaneously drive the blind fasteners eliminating rocking motion installation of the module assembly while assuring that the under-torqued fastener is independently driven until the desired torque limit is reached. The tool thereby reduces FOD concerns from spring fingers sheering off due to the heretofore rocking motion of prior installation methods, reduces the risk of damage to the module assembly 30 during installation, and decreases installation time.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A tool for installing and removing a module assembly, wherein the module assembly has a handle, the tool comprising:
    a gear system;
    an input to the gear system;
    a first output from the gear system, the first output along a first axis;
    a second output from the gear system, the second output along a second axis;
    a first torque limiter attached to the first output along the first axis;
    a second torque limiter attached to the second output along the second axis;
    a first tool bit attached to the first torque limiter along the first axis;
    a second tool bit attached to the second torque limiter along the second axis; and
    an index configured to engage the handle of the module assembly to align the first output and the second output relative to the module assembly.

2. The tool as recited in claim 1, wherein the first axis and the second axis are parallel.

3. The tool as recited in claim 1, further comprising a housing that contains the gear system.

4. The tool as recited in claim 1, further comprising a tool handle that extends from the housing perpendicular to the index.

5. The tool as recited in claim 1, wherein the first and second torque limiter comprise a square drive interface for attachment to the output.

6. The tool as recited in claim 1, wherein the first and second torque limiter comprise a square drive interface for attachment of the tool bit.

7. The tool as recited in claim 1, wherein the first and second tool bit is a hex bit.

8. The tool as recited in claim 1, wherein the first and second tool bit is a screw-driver bit.

9. The tool as recited in claim 1, wherein the gear system comprises a staggered 5-gear pattern.

10. The tool as recited in claim 9, wherein each gear of the gear system is identical.

11. The tool as recited in claim 1, wherein the gear system comprises a 4-gear pattern that provides a scaled system between the first and second outputs.

12. A tool for installing and removing a module assembly, comprising:
    a housing comprising an index that is received onto a handle of the module assembly;
    a gear system contained within the housing;
    an input to the gear system;
    a first output from the gear system, the first output along a first axis;
    a second output from the gear system, the second output along a second axis, the second axis parallel to the first axis;
    a first torque limiter attached to the first output along the first axis;
    a second torque limiter attached to the second output along the second axis;
    a first tool bit attached to the first torque limiter along the first axis; and
    a second tool bit attached to the second torque limiter along the second axis, wherein the index is configured to position the first output and the second output relative to the module assembly.

13. The tool as recited in claim 12, wherein the first and second torque limiter comprise a male square drive interface for attachment to the output.

14. The tool as recited in claim 13, wherein the first and second torque limiter comprise a female square drive interface for attachment of the tool bit.

15. The tool as recited in claim 12, further comprising a tool handle that extends from the housing perpendicular to the interface.

16. A method for installing a module assembly, comprising:
    locating an index of the tool as recited in claim 1 onto the handle of the module assembly such that a respective first and second tool bit from a first and a second output of the tool are aligned and preloaded onto a first and second blind fastener of the module assembly; and
    driving an input to a gear system of the tool until each of a first and a second torque limiter mounted between the respective first and second output and the first and second tool bit independently reach the desired preset torque.

17. The method as recited in claim 16, wherein the first tool bit is located along a first axis and the second tool bit is located along a second axis.

18. The method as recited in claim 17, wherein the first axis is parallel to the second axis.

19. The method as recited in claim 16, wherein driving the input to the gear system of the tool comprises driving the input until there is a clicking from each of a first and a second torque limiter.

* * * * *